US010614766B2

(12) United States Patent
Luo et al.

(10) Patent No.: US 10,614,766 B2
(45) Date of Patent: Apr. 7, 2020

(54) VOLTAGE REGULATOR AND METHOD APPLIED THERETO

(71) Applicant: NOVATEK MICROELECTRONICS CORP., HsinChu (TW)

(72) Inventors: Ren-Hong Luo, Hsinchu (TW);
Shih-Chun Lin, Kaohsiung (TW);
Yung-Cheng Lin, Zhubei (TW);
Mu-Jung Chen, Tainan (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 111 days.

(21) Appl. No.: 15/159,777

(22) Filed: May 19, 2016

(65) Prior Publication Data

US 2017/0337886 A1   Nov. 23, 2017

(51) Int. Cl.
*G09G 3/36*   (2006.01)
*H02M 1/00*   (2006.01)
*H02M 1/088*  (2006.01)

(52) U.S. Cl.
CPC .......... *G09G 3/36* (2013.01); *G09G 3/3611* (2013.01); *G09G 2330/021* (2013.01);
(Continued)

(58) Field of Classification Search
CPC .. G09G 3/36; G09G 2330/021; G09G 3/3611; G09G 2370/08; H02M 3/158; H02M 1/08; H02M 2001/0009; H02M 3/156; H02M 1/088; H02M 2001/0045; G05F 1/56; G05F 1/59; G05F 1/563; G05F 1/595; G05F 1/462; G05F 1/465; G05F 1/468; G05F 1/575; G05F 1/562; G05F 1/565
(Continued)

(56) References Cited

U.S. PATENT DOCUMENTS 6,246,214 B1 * 6/2001 Oglesbee ............... H02J 7/0029
320/136
7,639,067 B1 * 12/2009 Perisetty ............... H02M 3/073
326/41
(Continued)

OTHER PUBLICATIONS

Received STIC search report from EIC 2800 searcher Benjamin Martin dated Oct. 18, 2017.*
(Continued)

*Primary Examiner* — Nguyen Tran
*Assistant Examiner* — Htet Z Kyaw
(74) *Attorney, Agent, or Firm* — Rabin & Berdo, P.C.

(57) ABSTRACT

A voltage regulator and method applied thereto are provided. The voltage regulator generates a regulated voltage in response to a reference voltage and a control code. The voltage regulator includes a voltage divider circuit, an amplifier circuit, and a power MOS array. The voltage divider circuit is configured to divide the regulated voltage to generate a feedback voltage. The amplifier circuit is configured to amplify a voltage difference between the reference voltage and the feedback voltage to generate a bias voltage. The power MOS array includes multiple transistors. Each transistor has a first terminal coupled to a power rail, a second terminal coupled to the regulated voltage, and a control terminal selectively coupled to either the power rail or the bias voltage in response to the control code.

20 Claims, 8 Drawing Sheets

(52) U.S. Cl.
CPC ......... *G09G 2370/08* (2013.01); *H02M 1/088* (2013.01); *H02M 2001/0045* (2013.01)

(58) Field of Classification Search
USPC .......................... 323/265–282; 327/538–543
See application file for complete search history.

(56) References Cited

U.S. PATENT DOCUMENTS

| | | | | |
|---|---|---|---|---|
| 8,026,702 B2* | 9/2011 | Tanzawa | ............... | G05F 1/577 |
| | | | | 323/267 |
| 9,000,837 B1* | 4/2015 | Fifield | ............... | G11C 29/028 |
| | | | | 327/306 |
| 9,148,312 B2* | 9/2015 | Chong | ............... | H04L 25/028 |
| 9,178,562 B2 | 11/2015 | Dua et al. | | |
| 2006/0103453 A1* | 5/2006 | Pisasale | ............... | G05F 3/262 |
| | | | | 327/541 |
| 2006/0234650 A1* | 10/2006 | Lee | ............... | H03F 3/45475 |
| | | | | 455/78 |
| 2009/0302815 A1* | 12/2009 | Tanzawa | ............... | G05F 1/577 |
| | | | | 323/282 |
| 2010/0052635 A1* | 3/2010 | Wang | ............... | G05F 1/575 |
| | | | | 323/280 |
| 2011/0298435 A1* | 12/2011 | Homol | ............... | H03F 3/72 |
| | | | | 323/282 |
| 2012/0001603 A1* | 1/2012 | Ouyang | ............... | H02M 3/1588 |
| | | | | 323/271 |
| 2012/0013314 A1* | 1/2012 | Tanzawa | ............... | G05F 1/577 |
| | | | | 323/267 |
| 2012/0112799 A1* | 5/2012 | Bae | ............... | H04L 25/0272 |
| | | | | 327/108 |
| 2012/0176112 A1* | 7/2012 | Singh | ............... | G05F 1/573 |
| | | | | 323/284 |
| 2014/0097816 A1* | 4/2014 | Chen | ............... | G05F 1/468 |
| | | | | 323/283 |
| 2014/0210545 A1* | 7/2014 | Leibowitz | ............... | G11C 5/147 |
| | | | | 327/540 |
| 2015/0042296 A1* | 2/2015 | Cheng | ............... | G05F 1/468 |
| | | | | 323/269 |
| 2015/0162839 A1* | 6/2015 | Wang | ............... | H02M 3/33507 |
| | | | | 315/206 |
| 2016/0111963 A1* | 4/2016 | Oyama | ............... | H02M 3/33523 |
| | | | | 363/21.15 |
| 2017/0187298 A1* | 6/2017 | Lin | ............... | H02M 3/33523 |
| 2017/0346299 A1* | 11/2017 | Sridhar | ............ | H03K 19/00384 |

OTHER PUBLICATIONS

Yasuyuki Okuma et al., "0.5-V Input Digital LDO with 98.7% Current efficiency and 2.7 µA Quiescent Current in 86nm CMOS", IEEE Custom Integrated Circuits Conference 2010, San Jose, CA 2010, pp. 1-4. (Year: 2010).*

Received STIC search report from EIC 2800 searcher Benjamin Martin dated Feb. 13, 2019. (Year: 2019).*

* cited by examiner

VOLTAGE REGULATOR AND METHOD APPLIED THERETO

TECHNICAL FIELD

The disclosure relates in general to a voltage regulator and a method applied thereto, and more particularly to a voltage regulator with power adjustment capability.

BACKGROUND

Liquid crystal display (LCD) has been widely used in daily life, and a voltage mode transmitter (TX) is commonly used in a timing controller within the LCD panel. As the resolution of the LCD panel increases, the amount of transmission data required for the timing controller increases as well. Thus there may be higher data rate or additional ports required for the voltage mode transmitter. In addition, there are various applications of the LCD panel having different design requirements. For example, a larger panel may need a larger driver signal swing to overcome channel attenuation. On the other hand, a smaller panel may need a smaller signal swing to reduce power consumption. Therefore, it is an important subject in the industry to design a voltage regulator for supplying power to the voltage mode transmitter in order to meet a variety of design requirements.

SUMMARY

The disclosure is directed to a voltage regulator and method applied thereto, such that the output current range of the voltage regulator can be enhanced.

According to one embodiment of the invention, a voltage regulator is provided. The voltage regulator generates a regulated voltage in response to a reference voltage and a control code. The voltage regulator includes a voltage divider circuit, an amplifier circuit, and a power MOS array. The voltage divider circuit is configured to divide the regulated voltage to generate a feedback voltage. The amplifier circuit is configured to amplify a voltage difference between the reference voltage and the feedback voltage to generate a bias voltage. The power MOS array includes multiple transistors. Each transistor has a first terminal coupled to a power rail, a second terminal coupled to the regulated voltage, and a control terminal selectively coupled to either the power rail or the bias voltage in response to the control code.

According to one embodiment of the invention, a method for generating a regulated voltage is provided. The method includes the following steps. Generate a feedback voltage by dividing the regulated voltage. Generate a bias voltage by amplifying a voltage difference between the reference voltage and the feedback voltage. Provide a power MOS array, including multiple transistors, wherein each transistor has a first terminal coupled to a power rail, a second terminal coupled to the regulated voltage, and a control terminal selectively coupled to either the power rail or the bias voltage in response to the control code.

The invention will become apparent from the following detailed description of the preferred but non-limiting embodiments. The following description is made with reference to the accompanying drawings.

Figure 1:
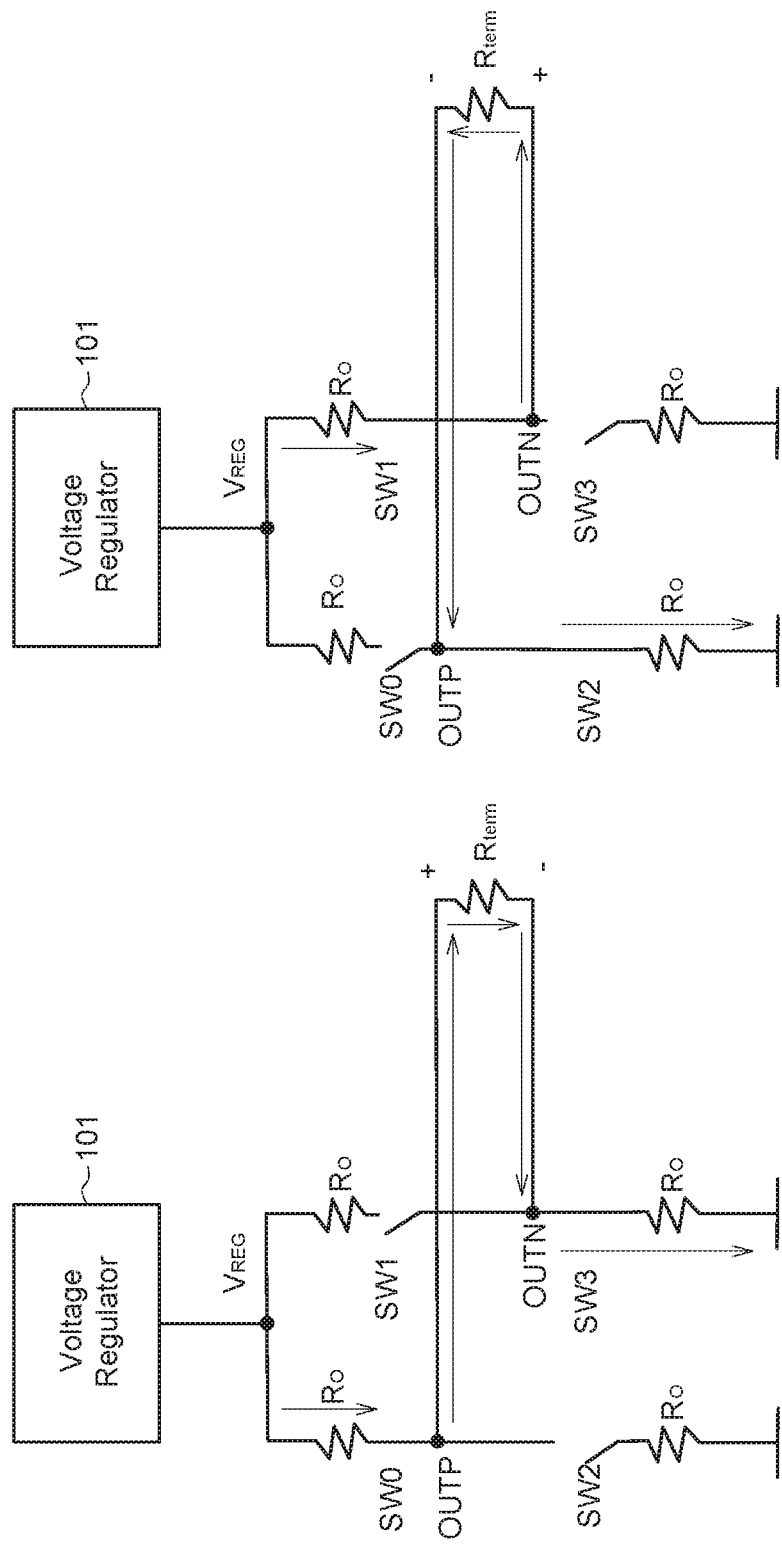
FIG. 1 shows a diagram illustrating an example voltage mode transmitter and its load.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows a diagram illustrating an example voltage mode transmitter and its load. The voltage regulator 101 generates a regulated voltage $V_{REG}$, supplying power to a voltage mode TX with a load $R_{term}$. Switches in the voltage mode TX are controlled by differential signals SW0-SW3. When the switches SW0 and SW3 are turned on (the other two switches SW1 and SW2 are turned off), a current $I_{REG}$ flows from the node OUTP to the node OUTN, generating an output voltage $V_{OD}$ ($V_{OD}=I_{REG} \times R_{term}$) across the load $R_{term}$, where the current $I_{REG}=V_{REG}/(2 \times Ro+R_{term})$. When the switches SW1 and SW2 are turned on, the current $I_{REG}$ flows from the node OUTN to the node OUTP, generating the output voltage $V_{OD}$ ($V_{OD}=-I_{REG} \times R_{term}$) across the load $R_{term}$. The voltage mode TX transmits information by alternating the polarity of the output voltage $V_{OD}$. The load $R_{term}$ may represent the loading in a LCD panel. As can be seen in this example, the current $I_{REG}$ changes when the required signal swing of the output voltage $V_{OD}$ changes. In other words, the swing range of the output voltage $V_{OD}$ may be restricted by the current $I_{REG}$ supplied by the voltage regulator 101.

Figure 2:
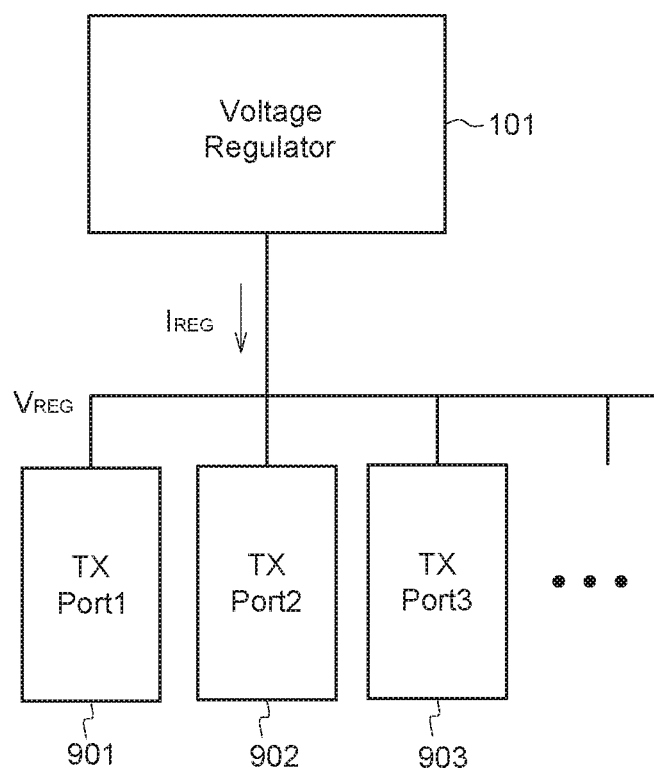
FIG. 2 shows a diagram illustrating an example system with a voltage regulator and multiple voltage mode transmitters.

FIG. 2 shows a diagram illustrating an example system with a voltage regulator 101 and multiple voltage mode transmitters. In this example, the voltage regulator 101 supplies power to multiple TX, including TX port1 901, TX port2 902, TX port 3 903, and so on. Multiple TX ports may represent multiple channels in a LCD panel. Taking the circuit structure of TX in FIG. 1 for example, in the multiple port TX configuration in FIG. 2, the current $I_{REG}$ supplied by the voltage regulator 101 is $$I_{REG} = Np \times \frac{V_{REG}}{2 \times Ro + R_{term}},$$

where Np is the number of ports in this configuration. In this example system, when the voltage regulator 101 supplies power to multiple TX, the output current $I_{REG}$ is proportional to the number of ports. Because the number of ports used may vary depending on the applications, the output current range required for the voltage regulator 101 becomes larger.

As can be seen in the examples shown in FIG. 1 and FIG. 2, when there is variability in either signal swing or TX port number, the performance of the voltage regulator would be affected, including for example, the output current range of the voltage regulator would be restricted by the operating region of a power metal-oxide-semiconductor (MOS) used in the voltage regulator. In order to support flexible signal swing range and flexible transmitter port number, a voltage regulator with power adjustment capability is provided in this disclosure.

Figure 3:
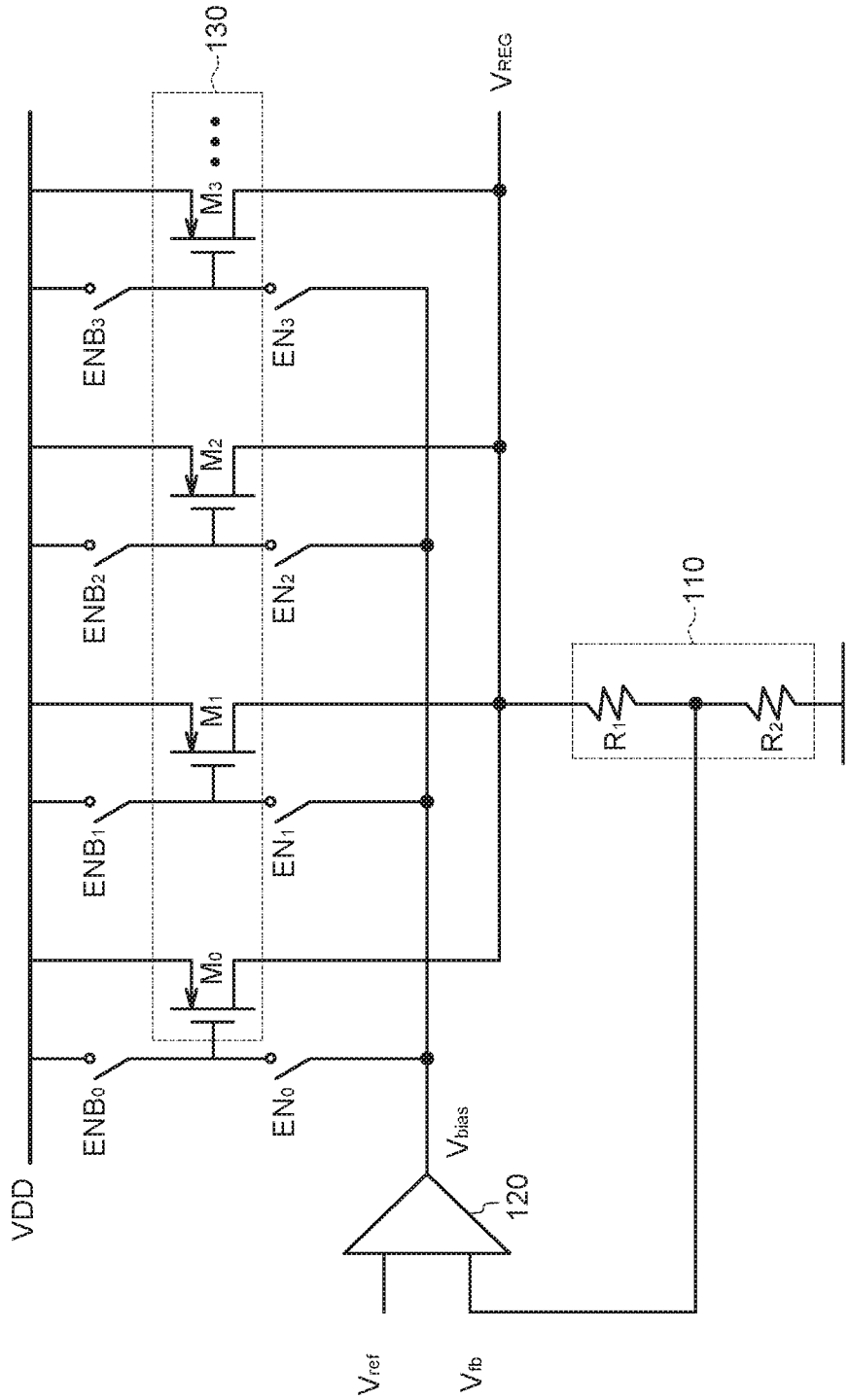
FIG. 3 shows a voltage regulator according to one embodiment of the invention.

FIG. 3 shows a voltage regulator 102 according to one embodiment of the invention. The voltage regulator 102 generates a regulated voltage $V_{REG}$ in response to a reference voltage $V_{ref}$ and a control code. The voltage regulator 102 includes a voltage divider circuit 110, an amplifier circuit 120, and a power MOS array 130. The voltage divider circuit 110 is configured to divide the regulated voltage $V_{REG}$ to generate a feedback voltage $V_{fb}$. The amplifier circuit 120 is configured to amplify a voltage difference between the reference voltage $V_{ref}$ and the feedback voltage $V_{fb}$ to generate a bias voltage $V_{bias}$. The power MOS array 130 includes multiple transistors. Each transistor has a first terminal (for example, source terminal) coupled to a power rail (supply voltage VDD in this example), a second terminal (for example, drain terminal) coupled to the regulated voltage $V_{REG}$, and a control terminal (for example, gate terminal) selectively coupled to either the power rail or the bias voltage $V_{bias}$ in response to the control code.

The voltage divider circuit 110 shown in FIG. 3 includes resistors R1 and R2. Two resistors are shown here for simple illustration. The voltage divider circuit 110 may also include more resistors. For example, the resistor R1 in FIG. 3 may represent an equivalent resistor of multiple resistors connected in series or connected in parallel. The voltage divider circuit 110 constitutes part of a negative feedback path by dividing the regulated voltage $V_{REG}$ to generate the feedback voltage $V_{fb}$. In this example, the feedback voltage $$V_{fb} = V_{REG} \times \frac{R_2}{R_1 + R_2}.$$

The magnitude of the regulated voltage $V_{REG}$ may be determined by setting the reference voltage $V_{ref}$. The voltage divider circuit 110 detects the currently generated regulated voltage $V_{REG}$, and then the feedback voltage $V_{fb}$ is compared with the reference voltage $V_{ref}$. The voltage difference between the reference voltage $V_{ref}$ and the feedback voltage $V_{fb}$ is amplified to generate the bias voltage $V_{bias}$. The power MOS array 130 may generate the regulated voltage $V_{REG}$ in response to the bias voltage $V_{bias}$.

The power MOS array 130 includes multiple transistors. Four transistors $M_0$-$M_3$ are shown in FIG. 3 for example. However, the number of the transistors may also be fewer than four or more than four. P-channel MOS (PMOS) are used in this embodiment. N-channel MOS (NMOS) may be used in the power MOS array 130 in another embodiment. The control terminal of each transistor $M_0$-$M_3$ is selectively coupled to either the power rail VDD or the bias voltage $V_{bias}$ according to the digital control code $EN_0$-$EN_3$ (represented as EN[3:0]) and $ENB_0$-$ENB_3$ (represented as ENB[3:0]). The control code ENB[3:0] is the complement of the control code EN[3:0]. Taking transistor $M_0$ for example, if the control code $EN_0$ is logic low, the control code $ENB_0$ is logic high, and the control terminal of the transistor $M_0$ is coupled to the power rail VDD. For a PMOS having the control terminal coupled to the supply voltage, the PMOS operates in a cutoff region. If the control code $EN_0$ is logic high, the control code $ENB_0$ is logic low, the control terminal of the transistor $M_0$ is coupled to the bias voltage. The transistor $M_0$ is turned on and contributes to part of the output current $I_{REG}$.

By adjusting the control code EN[3:0] and ENB[3:0], each transistor $M_0$-$M_3$ in the power MOS array 130 may be selectively turned on. If multiple transistors among the power MOS array 130 are turned on, these conducting transistors are connected in parallel to be able to provide a larger conducting current. As a result, the voltage regulator 102 is able to support a larger signal swing required by the voltage mode transmitter. The power MOS array 130 may be regarded as a transistor with adjustable size. With more transistors being turned on, the power MOS array 130 may be regarded as a transistor with a larger W/L ratio. The number of transistors turned on may be determined by the control code. Therefore, the control code, including EN[3:0] and ENB[3:0], may be set according to the design requirements, including output current requirement, output signal swing range, and number of transmitter ports.

For a voltage regulator to work reliably with good performance, the power MOS needs to work in a saturation region. In a voltage regulator with single power MOS with fixed size, if the required voltage swing or the number of TX ports is too large, the regulated current becomes too large such that the power MOS operates in a linear region. The performance of the voltage regulator is thus affected, including the regulated voltage, load transient response, output noise, and power noise rejection ratio. On the other hand, if the required voltage swing or the number of TX ports is too small, the power MOS operates in a cutoff region, the loop gain and loop stability of the voltage regulator are degraded. On the contrary, in the voltage regulator 102 shown in FIG. 3, the transistors in the power MOS array 130 may be selectively turned on. By appropriately setting the control code, all the conducting transistors (with the control terminal coupled to the bias voltage $V_{bias}$) may operate in the saturation region to provide a stable output regulated voltage $V_{REG}$. For example, if one of the conducting transistors operates in a linear region, more transistors may be turned on in an attempt to lower the current flowing through that transistor.

In summary, if the power MOS array 130 is regarded as a single power MOS with variable size, after the control code is determined depending on the design requirements, the size of the power MOS in the voltage regulator 102 is adjusted to provide the output current corresponding to the design requirements. By providing the appropriate control code, each conducting transistor in the power MOS array 130 operates in a saturation region. By accommodating the power MOS array 130, the voltage regulator 102 can provide a wider range of output current as compared to a voltage regulator having only a single power MOS with fixed size. The voltage regulator 102 may supply power to one or more voltage mode transmitters in a display panel, where examples of one or more voltage mode transmitters may be referred to FIG. 1 or FIG. 2. Because the output current range of the voltage regulator 102 is enhanced, the transmitter output swing has a wider range, and the number of supplying transmitter ports can be increased as well.

In one embodiment, sizes of the transistors in the power MOS array 130 may be binary weighted in order to achieve efficient control. For example, the sizes of the transistor $M_0$, $M_1$, $M_2$, $M_3$ may be 1×, 2×, 4×, 8×, respectively. The smallest transistor with 1× size may be referred as a unit transistor. With these binary weightings, by setting the control code EN[3:0] from "0000" to "1111", equivalently 0 to 15 unit transistors may be turned on, achieving 16 different configurations. For example, when EN[3:0] is "1010", transistors M0 and M2 operate in a cutoff region, transistors M1 and M3 operate in a saturation region, and equivalently 10 unit transistors are turned on. Binary weighted transistors are just one example for designing the sizes of transistors in the power MOS array 130, other different sizing strategies may also be applicable. For example, in one embodiment, all the transistors in the power MOS array 130 may have the same size. The control code may be determined in different ways according to different sizing strategies used in the power MOS array 130.

Figure 6:
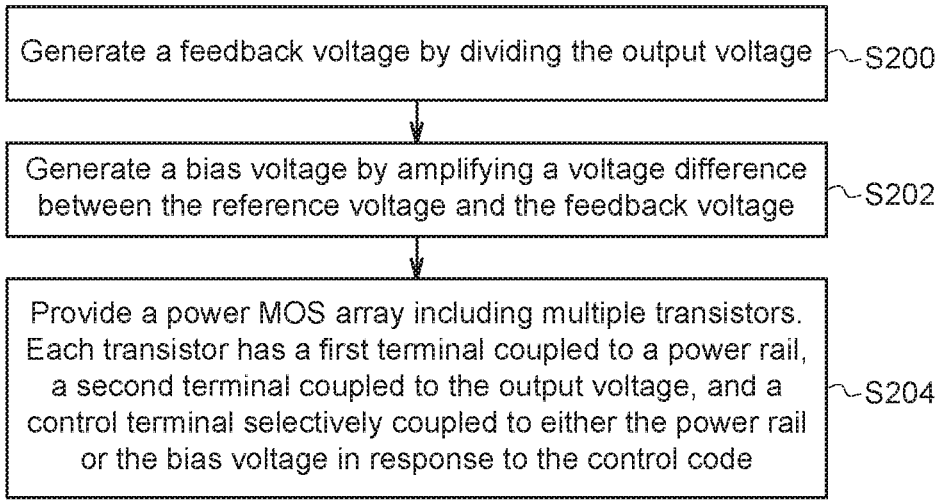
FIG. 6 shows a flowchart of the method for generating a regulated voltage according to one embodiment of the invention.

The method for generating the regulated voltage applied to the voltage regulator 102 may be referred to FIG. 6, which shows a flowchart of the method for generating a regulated voltage according to one embodiment of the invention. The method includes the following steps. Step S200: Generate a feedback voltage by dividing the regulated voltage. The step S200 may be performed by a voltage divider circuit. Step S202: Generate a bias voltage by amplifying a voltage difference between the reference voltage and the feedback voltage. The step S202 may be performed by an amplifier circuit. Step S204: Provide a power MOS array, including multiple transistors, wherein each transistor has a first terminal coupled to a power rail, a second terminal coupled to the regulated voltage, and a control terminal selectively coupled to either the power rail or the bias voltage in response to the control code.

Figure 4:
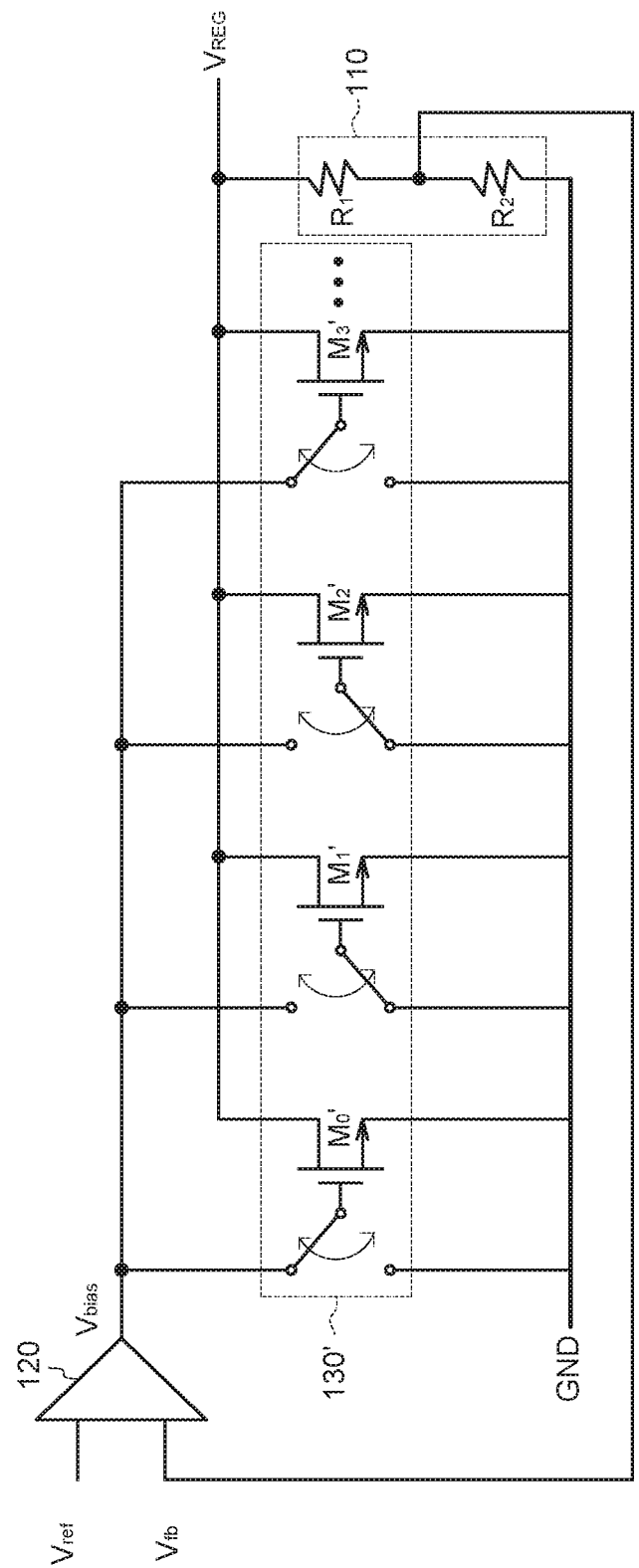
FIG. 4 shows a voltage regulator according to one embodiment of the invention.

FIG. 4 shows a voltage regulator 103 according to one embodiment of the invention. As described above, in one embodiment, the power MOS array may use NMOS instead of PMOS as shown in FIG. 3. The voltage regulator 103 includes a voltage divider circuit 110, an amplifier circuit 120, and a power MOS array 130'. The connection relationship between these circuits is the same as that in FIG. 3. However, the power MOS array 130' include multiple NMOS transistors $M_0'$-$M_3'$. Each transistor $M_0'$-$M_3'$ has a first terminal (for example, source terminal) coupled to a power rail (ground voltage GND in this example), a second terminal (for example, drain terminal) coupled to the regulated voltage $V_{REG}$, and a control terminal (for example, gate terminal) selectively coupled to either the power rail (GND) or the bias voltage $V_{bias}$ in response to the control code. The circuit implementation regarding the switches may also be different from that of the voltage regulator 102 in FIG. 3. In FIG. 4, each transistor $M_0'$-$M_3'$ is coupled to a single switch device that is switched between the bias voltage $V_{bias}$ and the power rail GND. These switches are controlled by the control code. The operating principles of the voltage regulator 103, including a negative feedback loop, adjustable power MOS array in response to the control code, operating regions of the transistors, are similar to those of the voltage regulator 102 and thus are not repeated here.

FIG. 3 and FIG. 4 show PMOS and NMOS implementations of the voltage regulator, respectively. In these embodiments, the control code may be manually set by a user or provided by an external control device. The control code may be determined according to the given design requirements and/or circuit operating conditions. In one embodiment, the voltage regulator may further include a built-in adaptive control circuit 150, such that the control code may be adjusted dynamically to achieve adaptive control.

Figure 7:
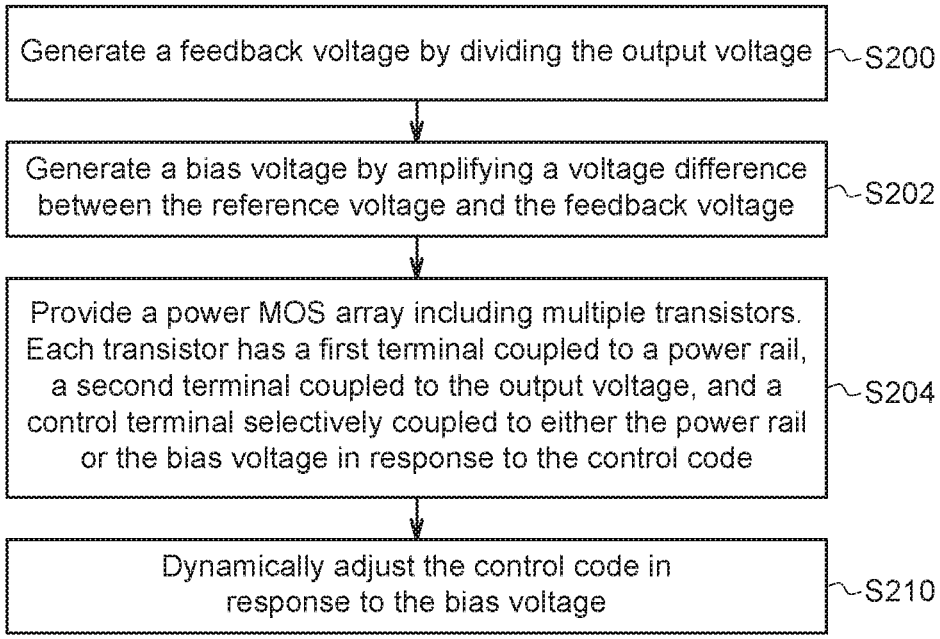
FIG. 7 shows a flowchart of the method for generating a regulated voltage with adaptive control according to one embodiment of the invention.

The adaptive control circuit 150 is configured to dynamically adjust the control code in response to the bias voltage $V_{bias}$. Be receiving the bias voltage $V_{bias}$, the adaptive control circuit 150 may detect the current state of the power MOS array 130, knowing whether the number of conducting transistors needs increasing or decreasing, and thus the adaptive control circuit 150 may determine an appropriate control code accordingly. The corresponding method may be referred to FIG. 7, which shows a flowchart of the method for generating a regulated voltage with adaptive control according to one embodiment of the invention. As compared to FIG. 6, the method further includes step S210: Dynamically adjust the control code in response to the bias voltage.

Figure 5:
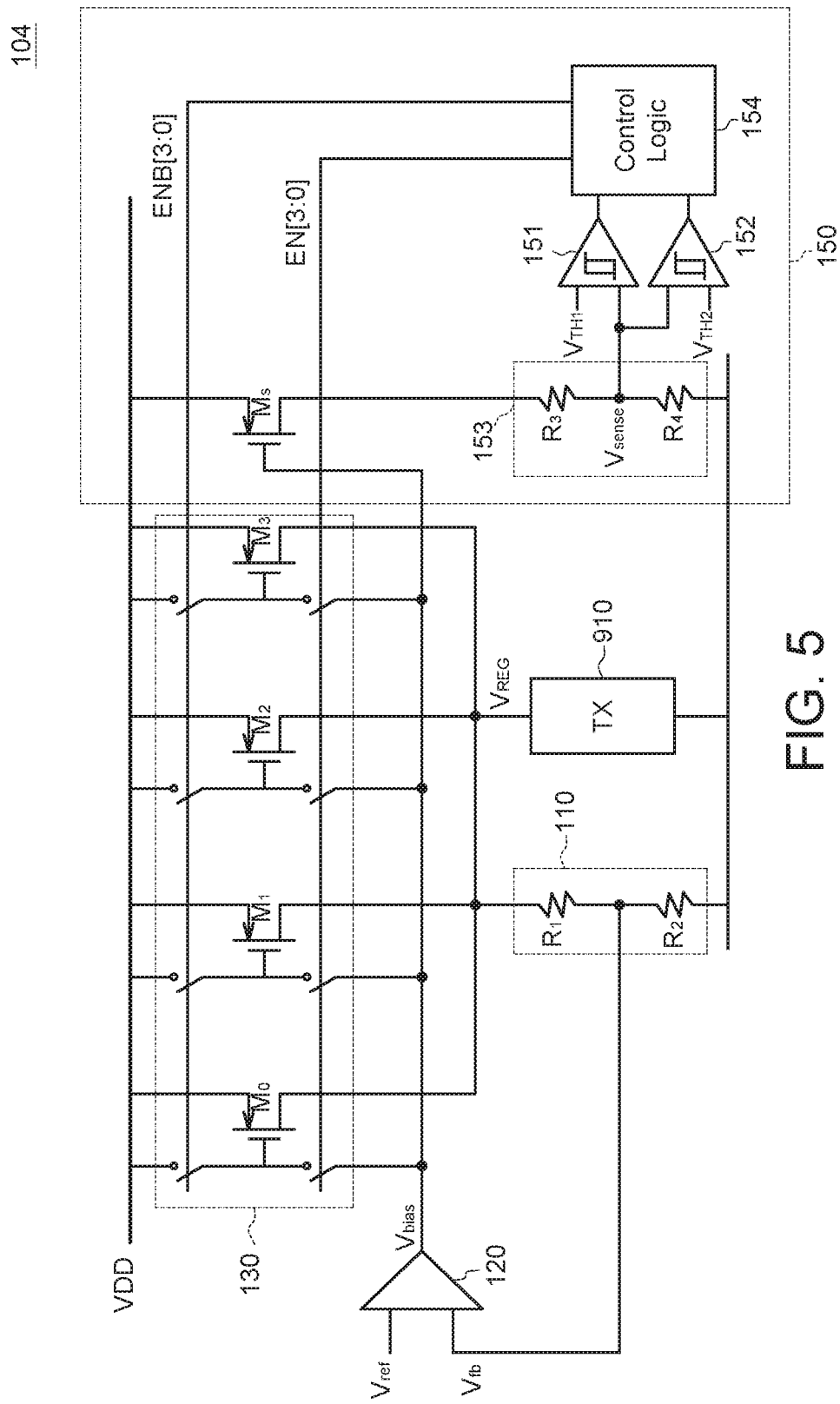
FIG. 5 shows a voltage regulator including an adaptive control circuit according to one embodiment of the invention.

There may be several ways of implementing the adaptive control circuit 150. One embodiment is given in FIG. 5, which shows a voltage regulator 104 including an adaptive control circuit 150 according to one embodiment of the invention. The voltage divider circuit 110, the amplifier circuit 120, and the power MOS array 130 are the same as those shown in FIG. 3 and thus are not repeated here. The regulated voltage $V_{REG}$ is supplied to at least one voltage mode transmitter 910. The adaptive control circuit 150 includes a sensing transistor $M_S$, a sensing voltage divider circuit 153, a first comparator circuit 151, a second comparator circuit 152, and a control logic circuit 154. Although two comparator circuits are shown in FIG. 5, one comparator circuit is sufficient for the adaptive control circuit 150. Description is given below regarding the adaptive control circuit 150 having one comparator circuit.

The sensing transistor $M_S$ may be of the same type as the transistors $M_0$-$M_3$ in the power MOS array 130 (PMOS in this example). The sensing transistor $M_S$ has a control terminal (gate terminal) coupled to the bias voltage $V_{bias}$, a first terminal (source terminal) coupled to the power rail (supply voltage VDD), and a second terminal (drain terminal). The sensing voltage divider circuit 153 is configured to divide a voltage at the second terminal of the sensing transistor $M_S$ to generate a sensing voltage $V_{sense}$. The sensing voltage divider circuit 153, including resistors $R_3$ and $R_4$, may be similar in structure to the voltage divider circuit 110. The first comparator 151 is configured to compare the sensing voltage $V_{sense}$ with a first threshold voltage $V_{TH1}$ to generate a first comparison signal. The control logic circuit 154 is configured to dynamically adjust the control code in response to the first comparison signal.

Because the control terminal sensing transistor $M_S$ is coupled to the bias voltage, like the control terminal of the transistors $M_0$-$M_3$ in the power MOS array 130, the sensing transistor $M_S$ effectively senses the conducting current of the power MOS array 130. The sensed current is transformed to a sensing voltage $V_{sense}$ through the voltage divider circuit 153. The sensing voltage $V_{sense}$ indicates how the conducting current should be adjusted. By evaluating the magnitude of the sensing voltage $V_{sense}$, for example, by comparing the sensing voltage $V_{sense}$ with the first threshold voltage $V_{TH1}$, the appropriate control code may be generated by the control logic circuit 154.

Figure 8:
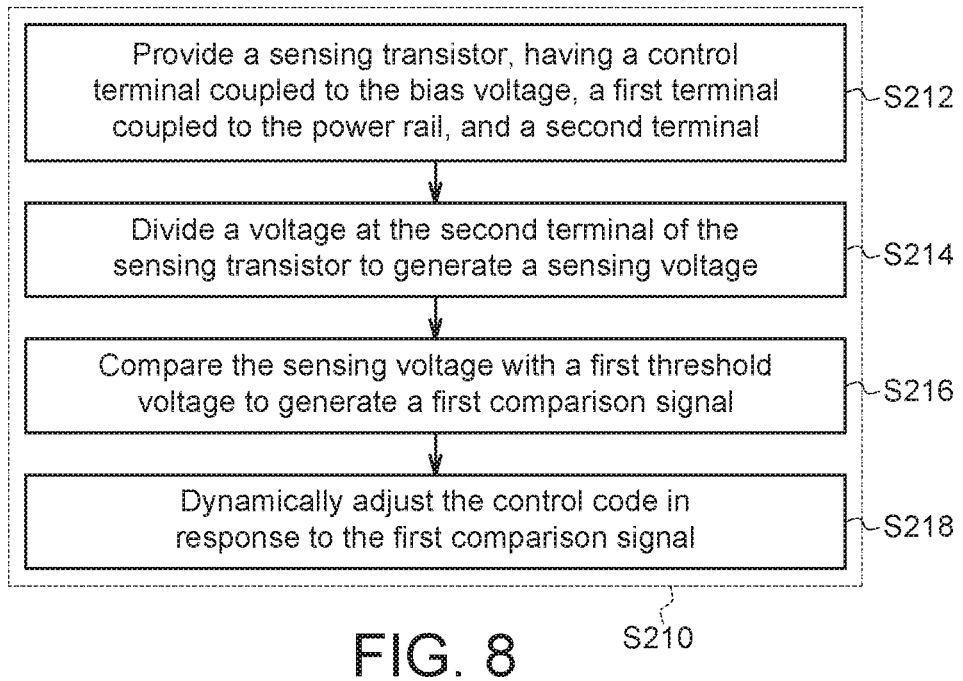
FIG. 8 shows a flowchart of the method for adaptive control according to one embodiment of the invention.

The related method may be referred to FIG. 8, which shows a flowchart of the method for adaptive control according to one embodiment of the invention. The step S210 in FIG. 7 may include the following steps. Step S212: Provide a sensing transistor, having a control terminal coupled to the bias voltage, a first terminal coupled to the power rail, and a second terminal. S214: Divide a voltage at the second terminal of the sensing transistor to generate a sensing voltage. Step S214 may be performed by a sensing voltage divider circuit. Step S216: Compare the sensing voltage with a first threshold voltage to generate a first comparison signal. Step S216 may be performed by a first comparator circuit. S218: Dynamically adjust the control code in response to the first comparison signal. Step S218 may be performed by a control logic circuit.

Figure 10:
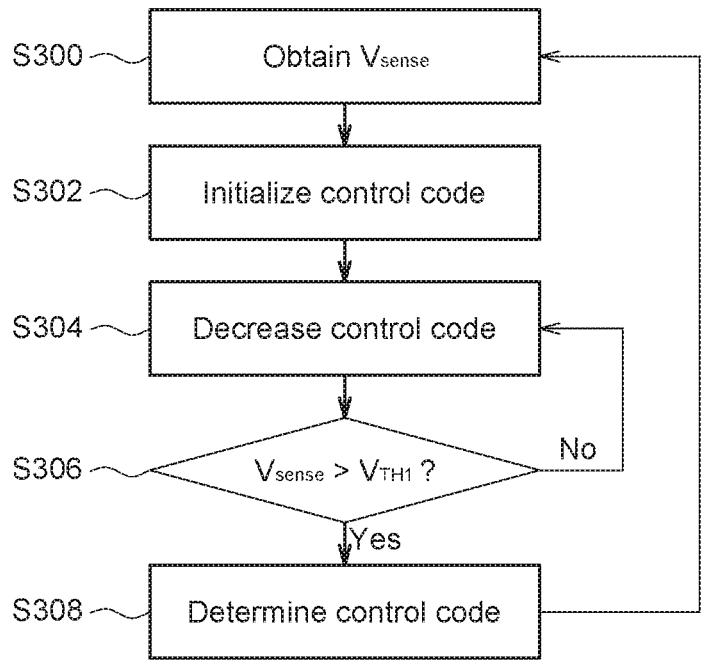
FIG. 10 shows a flowchart of the method for adaptive control using one threshold voltage according to one embodiment of the invention.

FIG. 10 shows a flowchart of the method for adaptive control using one threshold voltage according to one embodiment of the invention. Step S300: obtain the sensing voltage $V_{sense}$. Step S300 may be performed by a sensing transistor and a sensing voltage divider circuit. In one embodiment, the step S300 may be performed in a periodic way, for example, sampling the sensing voltage $V_{sense}$ at a sampling frequency. Step S302: initialize the control code. The control code may be initialized to a maximum value in one embodiment. For a 4-bit control code, the initial control code may be "1111" for example. In another embodiment, the control code may be initialized to a value increased from the previous result in step S308. For example, if the control code determined in step S308 is 6 ("0110" in binary representation), the initial control code in step S302 may be 6+3=9 ("1001" in binary representation) to avoid decreasing from the maximum value every time. Step S304: decrease the control code, for example, decreasing by 1 every time the step S304 is executed. Step S306: determine whether or not the sensing voltage $V_{sense}$ is greater than the first threshold voltage $V_{TH1}$. If no, continue decreasing the control code in step S304. If yes, proceed to step S308 to determine the control code, which may be the last control code that makes the sensing voltage $V_{sense}$ greater than the first threshold voltage $V_{TH1}$. The step S306 may be performed by a first comparator circuit. The steps S302, S304, and S308 may be performed by a control logic circuit.

In one embodiment, the adaptive control circuit 150 may include the first comparator circuit 151 and the second comparator circuit 152. The first comparator 151 is configured to compare the sensing voltage $V_{sense}$ with a first threshold voltage $V_{TH1}$ to generate a first comparison signal. The second comparator circuit 152 is configured to compare the sensing voltage $V_{sense}$ with a second threshold voltage $V_{TH2}$ to generate a second comparison signal. The first threshold voltage $V_{TH1}$ is higher than the second threshold voltage $V_{TH2}$. The control logic circuit 154 is configured to dynamically adjust the control code in response to the first comparison signal and the second comparison signal. The first threshold voltage $V_{TH1}$ and the second threshold voltage $V_{TH2}$ create an allowable range for the sensing voltage $V_{sense}$. The control logic circuit 154 may adjust the control code such that the sensing voltage $V_{sense}$ falls into the range specified by the first threshold voltage $V_{TH1}$ and the second threshold voltage $V_{TH2}$.

In one embodiment, the first comparison signal may be an "up" indication signal, and the second comparison signal may be a "down" indication signal. For example, the sensing voltage $V_{sense}$ increases as the conducing current of the power MOS array 130 increases. When the sensing voltage $V_{sense}$ becomes higher than the first threshold voltage $V_{TH1}$, the first comparison signal may become logic high, and the control logic circuit 154 is configured to increase the control code. For example, when the control code increases by 1, the number of "unit transistors" being turned on in the power MOS array increases by 1. The average current flowing through each unit transistor reduces accordingly. On the other hand, the sensing voltage $V_{sense}$ decreases as the conducing current of the power MOS array 130 decreases. When the sensing voltage $V_{sense}$ becomes lower than the second threshold voltage $V_{TH2}$ ($V_{TH2}<V_{TH1}$), the second comparison signal may become logic high, and the control logic circuit 154 is configured to decrease the control code. The average current flowing through each unit transistor increases accordingly. According to the process described above, the sensing voltage $V_{sense}$ eventually falls into the range between the second threshold voltage $V_{TH2}$ and the first threshold voltage $V_{TH1}$. The second threshold voltage $V_{TH2}$ and the first threshold voltage $V_{TH1}$ may be predetermined values.

The sensing transistor $M_S$ is utilized to sense the conducing current. In one embodiment, the sizes of the transistors in the power MOS array 130 are binary weighted, and the size of the sensing transistor $M_S$ is equal to the size of the smallest transistor among the transistors in the power MOS array 130 in order to save hardware area. Such sensing transistor $M_S$ (with size 1×) may be called a replica MOS because it replicates the size of the unit transistor in the power MOS array 130.

Figure 9:
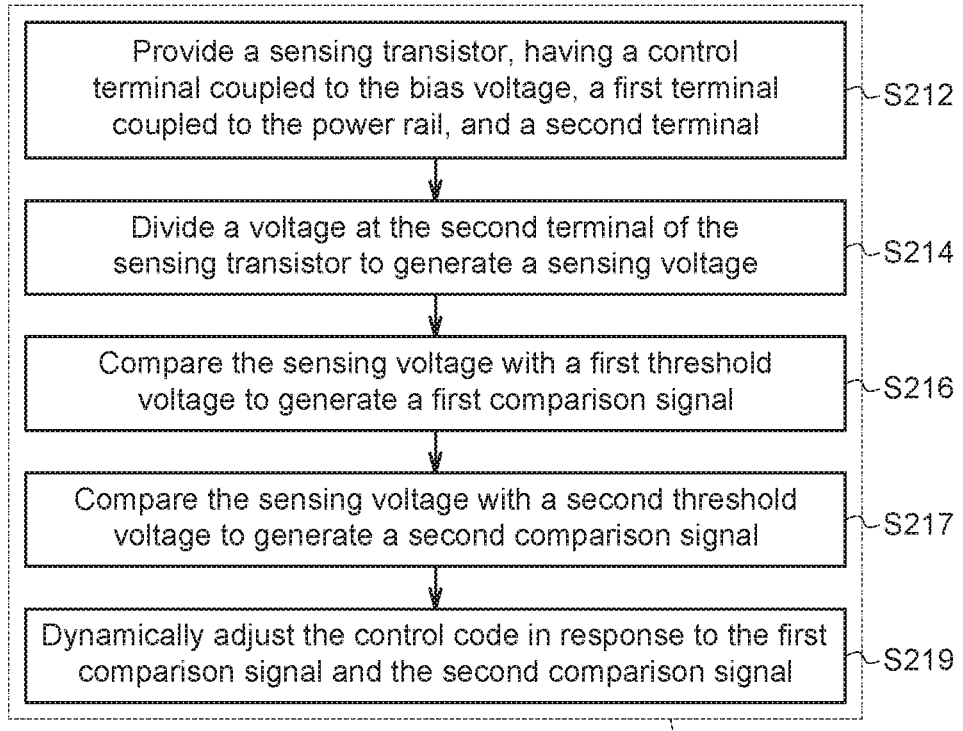
FIG. 9 shows a flowchart of the method for adaptive control according to one embodiment of the invention.

The method related to comparing the sensing voltage with two different threshold voltages may be referred to FIG. 9, which shows a flowchart of the method for adaptive control according to one embodiment of the invention. In this embodiment, the step S210 in FIG. 7 includes the following steps. Step S212: Provide a sensing transistor, having a control terminal coupled to the bias voltage, a first terminal coupled to the power rail, and a second terminal. Step S214: Divide a voltage at the second terminal of the sensing transistor to generate a sensing voltage. Step S216: Compare the sensing voltage with a first threshold voltage to generate a first comparison signal. Step S216 may be performed by a first comparator circuit. Step S217: Compare the sensing voltage with a second threshold voltage to generate a second comparison signal. Step S217 may be performed by a second comparator circuit. Step S219: Dynamically adjust the control code in response to the first comparison signal and the second comparison signal. Step S219 may be performed by a control logic circuit.

Figure 11:
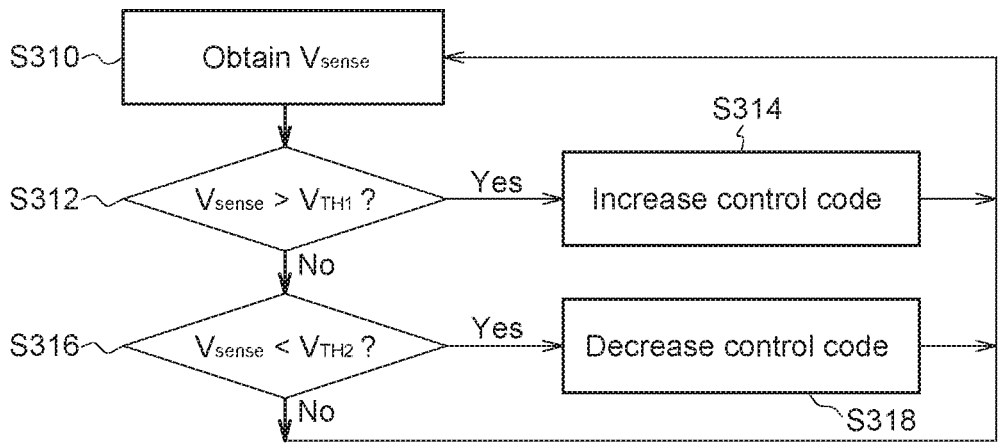
FIG. 11 shows a flowchart of the method for adaptive control using two threshold voltages according to one embodiment of the invention.

FIG. 11 shows a flowchart of the method for adaptive control using two threshold voltages according to one embodiment of the invention. Step S310: obtain the sensing voltage $V_{sense}$. Step S312: determine whether or not the sensing voltage $V_{sense}$ is greater than the first threshold voltage $V_{TH1}$. If yes, proceed to step S314 to increase the control code. If no, proceed to step S316 to determine whether or not the sensing voltage $V_{sense}$ is less than the second threshold voltage $V_{TH2}$. If yes, proceed to step S318 to decrease the control code. The control flow shown in FIG. 11 has been described with reference to the circuit shown in FIG. 5 and the flowchart shown in FIG. 9 and thus is not repeated here. As compared to the control flow shown in FIG. 10, by using two threshold voltages, the control flow may be simpler, yet an additional comparator circuit may be required.

By adopting the adaptive control circuit, the control code sent to the power MOS array can be adjusted automatically in response to the current circuit state. There is no need for a user to manually set the control code. Therefore, the proposed voltage regulator with the adaptive control circuit not only has the capability of adjusting supplied power to meet different design requirements, but also has the capability of dynamic self-adjustment to automatically identify an optimal control code.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A voltage regulator, for generating a regulated voltage in response to a reference voltage and a control code, the voltage regulator comprising:
    a voltage divider circuit, configured to divide the regulated voltage to generate a feedback voltage;
    an amplifier circuit, configured to amplify a voltage difference between the reference voltage and the feedback voltage to generate a bias voltage; and
    a power MOS array, comprising a plurality of transistors, a plurality of first switches and a plurality of second switches, the plurality of transistors coupled to the plurality of first switches and the plurality of second switches, wherein each transistor has a first terminal coupled to a power rail, a second terminal coupled to the regulated voltage, and a control terminal coupled to the power rail via the first switch in response to a first state of the control code and coupled to the bias voltage via the second switch in response to a second state of the control code,
    wherein by adjusting the control code, each transistor in the power MOS array is selectively turned on.

2. The voltage regulator according to claim 1, wherein among the plurality of transistors, a transistor having the control terminal coupled to the bias voltage operates in a saturation region.

3. The voltage regulator according to claim 1, wherein among the plurality of transistors, a transistor having the control terminal coupled to the power rail operates in a cutoff region.

4. The voltage regulator according to claim 1, wherein sizes of the plurality of transistors are binary weighted.

5. The voltage regulator according to claim 1, further comprising an adaptive control circuit, configured to dynamically adjust the control code in response to the bias voltage.

6. The voltage regulator according to claim 5, wherein the adaptive control circuit comprises:
    a sensing transistor, having a control terminal coupled to the bias voltage, a first terminal coupled to the power rail, and a second terminal;
    a sensing voltage divider circuit, configured to divide a voltage at the second terminal of the sensing transistor to generate a sensing voltage;
    a first comparator circuit, configured to compare the sensing voltage with a first threshold voltage to generate a first comparison signal; and
    a control logic circuit, configured to dynamically adjust the control code in response to the first comparison signal.

7. The voltage regulator according to claim 6, wherein the adaptive control circuit further comprises:
    a second comparator circuit, configured to compare the sensing voltage with a second threshold voltage to generate a second comparison signal;
    wherein the first threshold voltage is higher than the second threshold voltage, and the control logic circuit is configured to dynamically adjust the control code in response to the first comparison signal and the second comparison signal.

8. The voltage regulator according to claim 7, wherein the control logic circuit is configured to increase the control code when the sensing voltage is higher than the first threshold voltage, and the control logic circuit is configured to decrease the control code when the sensing voltage is lower than the second threshold voltage.

9. The voltage regulator according to claim 6, wherein the sizes of the plurality of transistors are binary weighted, and the size of the sensing transistor is equal to the size of the smallest transistor among the plurality of transistors.

10. The voltage regulator according to claim 1, wherein the regulated voltage is supplied to at least one voltage mode transmitter in a display panel.

11. A method for generating a regulated voltage in response to a reference voltage and a control code, the method comprising:
    generating a feedback voltage by dividing the regulated voltage;
    generating a bias voltage by amplifying a voltage difference between the reference voltage and the feedback voltage; and
    providing a power MOS array, comprising a plurality of transistors, a plurality of first switches and a plurality of second switches, the plurality of transistors coupled to the plurality of first switches and the plurality of second switches, wherein each transistor has a first terminal coupled to a power rail, a second terminal coupled to the regulated voltage, and a control terminal coupled to the power rail via the first switch in response to a first state of the control code and coupled to the bias voltage via the second switch in response to a second state of the control code,
    wherein by adjusting the control code, each transistor in the power MOS array is selectively turned on.

12. The method according to claim 11, wherein among the plurality of transistors, a transistor having the control terminal coupled to the bias voltage operates in a saturation region.

13. The method according to claim 11, wherein among the plurality of transistors, a transistor having the control terminal coupled to the power rail operates in a cutoff region.

14. The method according to claim 11, wherein sizes of the plurality of transistors are binary weighted.

15. The method according to claim 11, further comprising dynamically adjusting the control code in response to the bias voltage.

16. The method according to claim 15, wherein the step of dynamically adjusting the control code comprises:
    providing a sensing transistor, having a control terminal coupled to the bias voltage, a first terminal coupled to the power rail, and a second terminal;
    dividing a voltage at the second terminal of the sensing transistor to generate a sensing voltage;
    comparing the sensing voltage with a first threshold voltage to generate a first comparison signal; and
    dynamically adjusting the control code in response to the first comparison signal.

17. The method according to claim 16, wherein the step of dynamically adjusting the control code further comprises:
    comparing the sensing voltage with a second threshold voltage to generate a second comparison signal, wherein the first threshold voltage is higher than the second threshold voltage; and dynamically adjusting the control code in response to the first comparison signal and the second comparison signal.

18. The method according to claim 17, further comprising:
increasing the control code when the sensing voltage is higher than the first threshold voltage; and
decreasing the control code when the sensing voltage is lower than the second threshold voltage.

19. The method according to claim 16, wherein the sizes of the plurality of transistors are binary weighted, and the size of the sensing transistor is equal to the size of the smallest transistor among the plurality of transistors.

20. The method according to claim 11, wherein the regulated voltage is supplied to at least one voltage mode transmitter in a display panel.

* * * * *